United States Patent [19]

Forslund

[11] Patent Number: 4,766,939

[45] Date of Patent: Aug. 30, 1988

[54] ASSEMBLY FOR LIMBING TREE STEMS

[75] Inventor: Torsten Forslund, Alfta, Sweden

[73] Assignee: Osa AB, Alfta, Sweden

[21] Appl. No.: 37,392

[22] Filed: Apr. 9, 1987

[30] Foreign Application Priority Data

Apr. 11, 1986 [SE] Sweden ............................ 8601629

[51] Int. Cl.4 ............................................ B27L 1/00
[52] U.S. Cl. .............................. 144/2 Z; 144/242 D; 144/343
[58] Field of Search ................ 144/2 Z, 3 D, 242 D, 144/245 A, 338, 343

[56] References Cited

U.S. PATENT DOCUMENTS

| | | | |
|---|---|---|---|
| 3,763,905 | 10/1973 | Hamilton | 144/2 Z |
| 3,797,539 | 3/1974 | Moser et al. | 144/2 Z |
| 3,981,336 | 9/1976 | Levesque | 144/2 Z |
| 4,194,542 | 3/1980 | Eriksson | 144/2 Z |
| 4,515,192 | 5/1985 | Eriksson . | |

FOREIGN PATENT DOCUMENTS

| | | |
|---|---|---|
| 352836 | 6/1967 | Sweden . |
| 891029 | 4/1980 | U.S.S.R. . |
| 1021614 | 2/1982 | U.S.S.R. . |

OTHER PUBLICATIONS

PCT WO 86/03650 filed Dec. 13, 1985; Applicant: Nokka-Koneet.

Primary Examiner—W. Donald Bray
Attorney, Agent, or Firm—McFadden, Fincham & Co.

[57] ABSTRACT

An assembly for limbing tree stems comprises two limbing tools (53, 53') movable towards and away from each other, and two feeding units (1, 1') which are also movable towards and away from each other and arranged for longitudinal feeding of individual stems past the limbing tools limbing the stems. Each limbing tool (53) is connected to an associated feeding unit (1) and arranged to follow this unit when moving towards and away from the stem. Further, the limbing tool is located substantially in the extension of the contact surface of the feeding unit with respect to the stem. The feeding units and the limbing tools are movable towards and away from each other in a common plane to which rotary shafts for driving the feeding units are provided at right angles. Each limbing tool is mounted on at least one arm which is articulated or pivotally connected to a frame for the feeding unit.

10 Claims, 4 Drawing Sheets

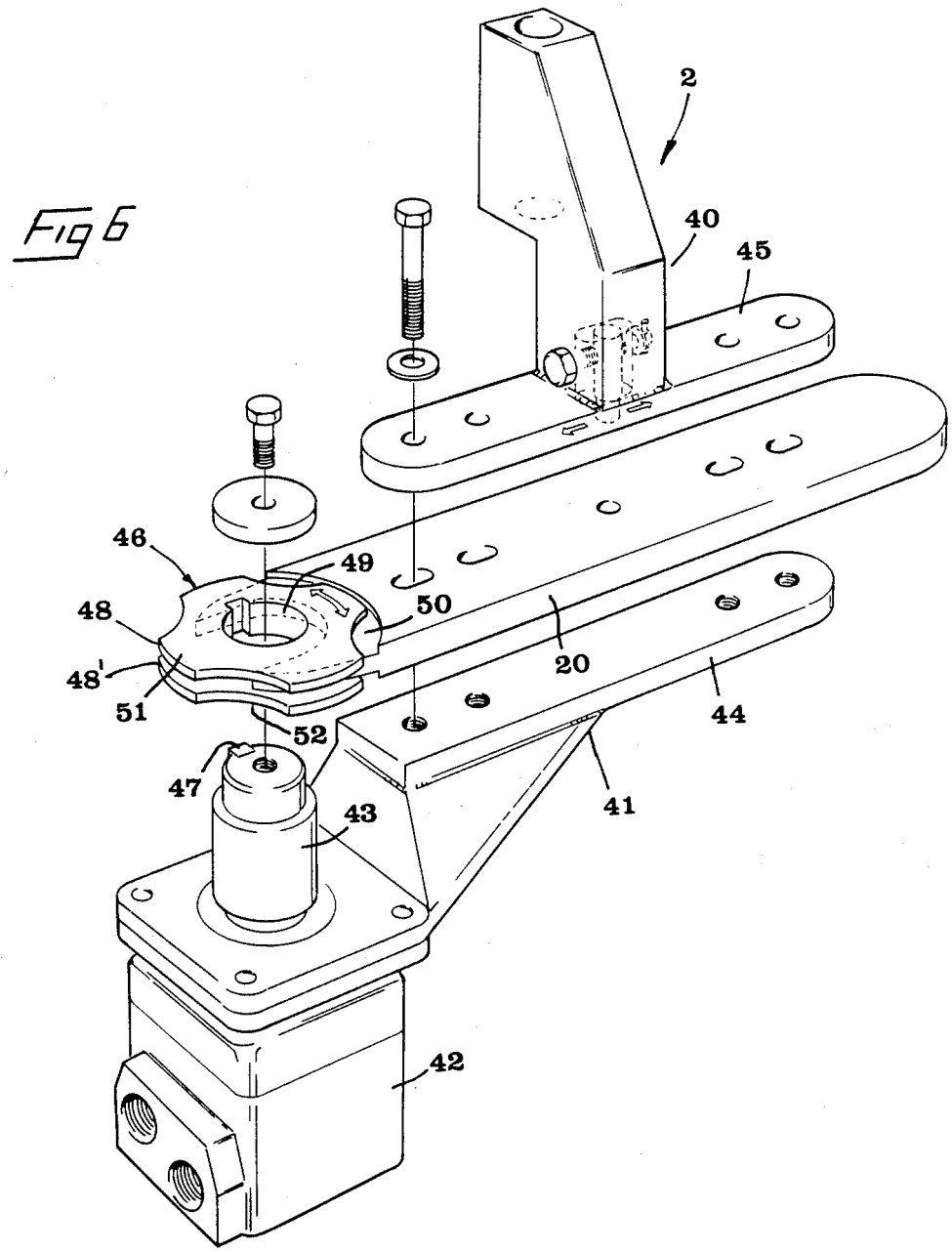

ASSEMBLY FOR LIMBING TREE STEMS

TECHNICAL FIELD OF THE INVENTION

This invention relates to an assembly for limbing tree stems, comprising at least two limbing knives or tools which are movable towards and away from each other, and two feeding units which are also movable towards and away from each other and arranged for longitudinal feeding of individual stems past said limbing tools limbing said stems, said feeding units and the associated limbing tools being movable towards and away from each other.

BACKGROUND OF THE INVENTION

Limbing assemblies of the type described above are normally included in such one-grapple harvesters as are used in mechanized forestry for felling, limbing and cutting trees into suitable lengths, both in stands with young trees and in stands for final felling. Certain prior art one-grapple harvesters have relied on the use of a so-called breast part which is moved in and applied to the stem of a standing tree, whereupon a plurality of arcuate or jaw-shaped gripping arms articulated to the breast part are swung in towards the stem for clamping and retaining it. Generally, the feeding units consist of spiked rollers which are pivotally connected to the breast part and which, after the tree has been cross-cut, are swung in towards the stem together with the limbing tools in order to carry out the required limbing operation. Since there are trees of highly varying diameters (small trees may have a stem diameter of about 40 mm and large trees a diameter of above 400 mm) and also since the same tree has a stem diameter varying from butt end to top end, the paths of movement of both the limbing tools and the feed rollers that should closely engage the stem will become rather complicated since the stem is always engaging the breast part, and the centre of the stem is thus moved away from or closer to the breast part depending on the variations of the stem diameter. In practice, this means that the suspensions for the feed rollers and the limbing tools must be given a complicated and expensive construction, and also that the angles of application of the limbing tools are not always ideal, which in turn means that the resistance to limbing quite often becomes extremely great.

SE laid-open application No. 8105907-3 describes a one-grapple harvester comprising two spiked rollers mounted on arms which may be provided with limbing tools and which are movable towards and away from each other, not only by being pivotal about joints or shafts but also by being linearly movable in srch a manner that the pivot shafts can be moved towards or away from each other. In this construction, the spiked rollers are however fixedly or stationarily mounted on the associated pivot arms, more specifically with their axes of rotation located in planes at right angles to the pivot shafts of the arms. By being fixedly mounted on the pivot arms, the stem-feeding spiked rollers may easily prove insufficient when a considerable limbing resistance arises. Thus, the limbing tools fixedly mounted on the arms and spaced from the spiked rollers in the feeding direction may encounter an unevenness or protuberance on the stem, for instance a large outgrowth which may appear in conjunction with a whorl of branches on the stem, while the spiked rollers are at the same time engaging a stem portion located behind which is at least slightly thinner than the stem portion with the protuberance which the limbing tools are engaging. As a result, the limbing tools are often liable to get stuck and the spiked rollers to slip.

BRIEF ACCOUNT OF THE INVENTIVE CONCEPT

The present invention aims at overcoming the above drawbacks and at providing a limbing assembly which is intended especially for one-grapple harvesters, has a simple construction and ensures effective limbing while providing minimal resistance to limbing. According to the invention, these and other objects are achieved in that each limbing tool is connected to an associated feeding unit and thus adapted to follow this unit when moving towards and away from the stem, and is mounted on at least one arm which is articulated or pivotally connected to a frame for the feeding unit by means of a pivot joint located substantially in the same plane as the contact surface of the feeding unit against the stem and having its pivot axis substantially parallel to said contact surface, whereby the limbing tool is positioned substantially in the extension of the contact surface of the feeding unit so as to ensure a direction of force application substantially parallel to the stem-feeding direction when the limbing tool encounters a branch.

According to a preferred embodiment of the invention, each feeding unit may comprise an endless chain composed of a plurality of chain-forming links which are articulated to each other and movable along the outer side or the periphery of an elongate rigid frame element and which by engaging the frame element are adapted to transmit a substantially evenly distributed pressure against the stem along substantially the entire length of the frame element.

BRIEF DESCRIPTION OF THE ACCOMPANYING DRAWINGS

In the drawings, FIG. 1 is a partly simplified perspective view illustrating a one-grapple harvester in which the inventive limbing assembly is included, FIG. 2 is a bottom plan view of the one-grapple harvester of FIG. 1 in the process of carrying out a limbing operation, FIG. 3 is a perspective view on a larger scale showing the construction of a feeding unit included in the limbing assembly of the invention, FIGS. 4 and 5 are exploded views showing two different types of links included in the feeding unit of FIG. 3, and FIG. 6 is an exploded view showing a frame for said feeding unit.

DETAILED DESCRIPTION OF A PREFERRED EMBODIMENT OF THE INVENTION

Figure 1:
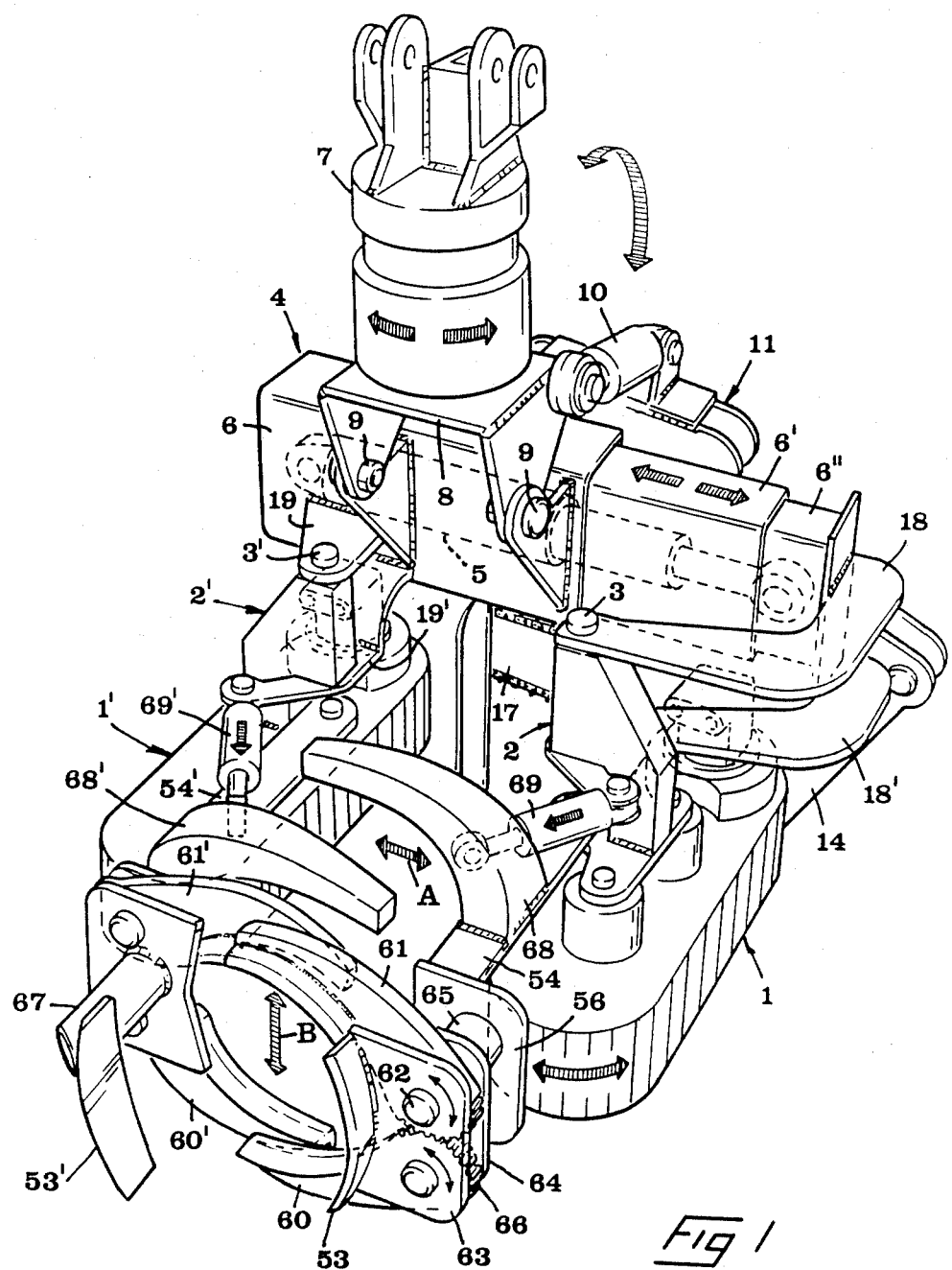
Figure 2:
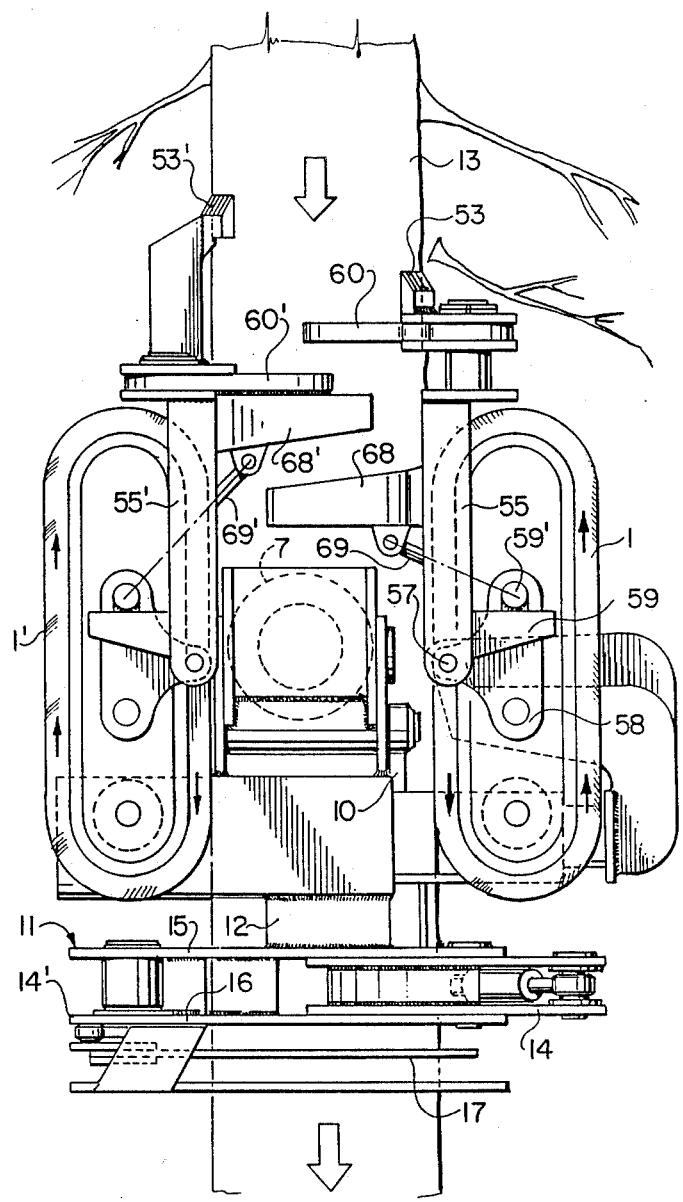
Figure 3:
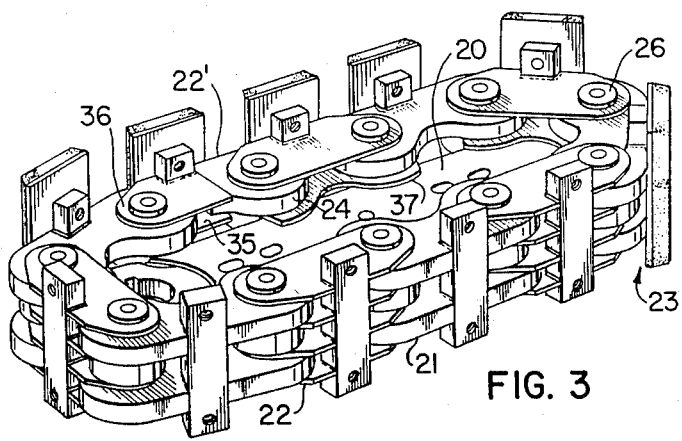

In FIGS. 1 and 2, there is shown a one-grapple harvester which includes a feeding device comprising two separate feeding units 1, 1'. These feeding units each include a frame generally designated 2, 2'. The frames 2, 2' are pivotally mounted by means of hinge pins 3, 3' on an applicator generally designated 4 which in the illustrated embodiment comprises three square tubes 6, 6', 6" which are telescopically movable in relation to each other by means of a hydraulic cylinder 5 and of which the largest tube 6 is suspended from a rotator 7 which in turn can be mounted in a per se known manner on the free end of a boom (not shown). In the illustrated embodiment, the rotator 7 is mounted on a plate 8 having two downwardly projecting lugs to which the telescopic tube 6 is connected by means of hinge joints 9 on brackets projecting from the tube, so that the tube 6 and, thus, the applicator 4 in its entirety can be pivoted through at least 90° from the position shown in FIG. 1, in which the feeding units 1, 1' are substantially horizontal, to a position in which they are substantially vertical. This pivotal movement is brought about by means of a hydraulic cylinder 10 one end of which is connected to the attachment 8 while the other end is connected to a grapple 11 rigidly connected to the telescopic tube 6 by a connecting member 12 (also see FIG. 2). Since the tubes 6, 6', 6" are displaceable, the two feeding units 1, 1' can be moved towards and away from each other in the direction of the double arrow A so as to engage or release a tree stem 13 located between them.

The grapple 11 comprises in a per se known manner a pivoted gripping arm 14 which is operated by a hydraulic cylinder and movable in relation to a fixed arm 14' having two separate arm parts 15, 16 between which the arm 14 is accommodated. By pivoting the arm 14 inwards towards the arm 14', any desired tree can be seized and retained. Below the grapple 11, there is provided a cutting tool 17 which may advantageously consist of a pivotable guide bar by means of which the clamped tree can be cross-cut at its butt end in a per se known manner.

The frame 2 of the feeding unit 1 is pivotally mounted in the free ends of two angled brackets 18, 18' which are provided on the free end of the movable telescopic tube 6" and which allow the feeding unit 1 to be moved close to the feeding unit 1' when the telescopic tube assembly is shortened. The other frame 2 is pivotally mounted in two relatively short brackets 19, 19' fixedly connected to the telescopic tube 6.

Figure 4:
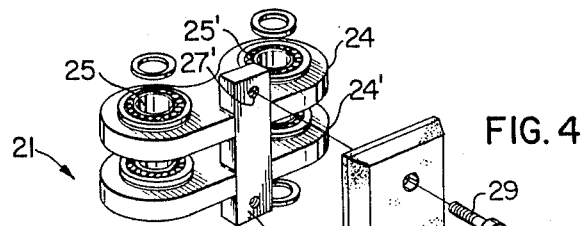

Reference is now made to FIGS. 3–6 which illustrate a feeding unit 1 in more detail. This unit comprises an elongate rigid frame element 20 along the periphery of which a plurality of hingedly interconnected links 21, 22 are movable, which together form a chain, generally designated 23, enclosing the chain. The element 20 consists of a comparatively thin guide bar having a peripheral edge portion which projects in between spaced-apart guide flanges or parts of at least some links. A first type of links, shown in FIG. 4, comprises two spaced-apart thick plates 24, 24', each having a pair of holes 25, 25' for hinge pins 26 serving to interconnect the links. The two plates 24, 24' are rigidly interconnected by means of a cross-piece 27 having two threaded holes 27' and serving as an attachment for a dismountable driver. In FIG. 4, there are shown three different variants of such drivers a first 28 of which is in the form of a rectangular plate of rubber or the like which is of uniform thickness and can be screwed to the attachment 27 by means of screws 29. It should be here noted that both the cross-piece 27 and the driver 28 have a length considerably exceeding the thickness of the guide bar 20, which means that the chain formed by the links will have a relatively large width. Also the driver 30 is a rubber plate but has a concave outer face instead of the planar outer face of the driver 28. Finally, the driver 31 is, as seen in cross-section, an angled sheet-metal section having a flange 32 to be mounted against the attachment 27, and a flange 33 which is bent at an acute angle to the flange 32 and the free end of which is cut at 34, more specifically at substantially right angles to the flange 32. In this manner, there is formed a sharp cutting edge for engaging the bark of the tree.

Figure 5:
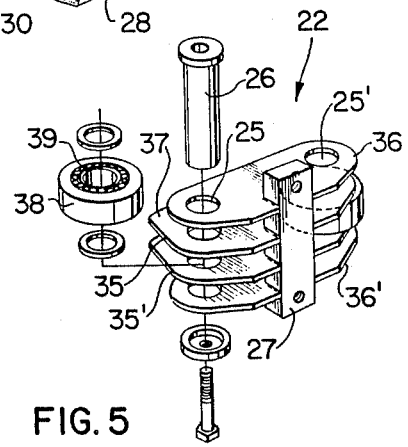

The other type of link 22, shown in FIG. 5, comprises four spaced-apart, suitably thin plates 35, 35' and 36, 36' which are also interconnected by means of a cross-piece 27 for the driver. The two intermediate plates 35, 35' are slightly extended inwardly in relation to the plates 36, 36' so as to form projections 37 serving as guide flanges enclosing the peripheral edge of the bar 20.

In order to reduce the frictional resistance between the bar 20 and the links 21, 22 when these are driven along the periphery of the bar, the links are associated with idling rollers 38. These may advantageously be mounted around the pin 26 connecting to adjoining links, a bearing 39 being provided between the roller and the hinge pin.

As appears from FIG. 6, the frame, generally designated 2, carrying the feeding unit 1 has a top part 40 and a bottom part 41 which includes a hydraulic motor 42 and a rotary shaft 43 driven by said motor. The bottom part 41 further includes a bracket-like support plate 44 on which the bar 20 can be fixed by means of a pressure plate 45 of the top part 40. At one end of the bar 20, there is provided a driving wheel 46 which engages with the rotary shaft 43 by the intermediary of a key 47. The driving wheel 46 has an overall thickness which does not essentially exceed the thickness of the bar 20. This is achieved in that the wheel is composed of two spaced-apart plates 48, 48' which are interconnected by means of a central hub-like portion 49 located in a recess defined by two fork-shaped projections on a thinner portion 50 of the bar 20. The wheel 46 has a plurality of projections 51 (in this case four) between which arcuate recesses 52 are defined. The projections 51 are adapted to engage between adjoining hinge pins of the chain, more specifically between the rollers 38 mounted on the hinge pins, the rounded recesses 52 engaging the circular periphery of the rollers. To facilitate the engagement and the disengagement of the wheel with respect to the rollers 38, the recesses 52 have a larger diameter than the rollers. In order to ensure flawless function of the chain during operation, there is an odd number of hinge pins, as appears from FIG. 3. This has been achieved by the use of a special link 22' one half of which is composed of two thick plates 24 and the other half of which of four thin plates 35, 36.

The two feeding units 1, 1' as shown in FIGS. 1 and 2 are adapted to cooperate not only in that they are movable towards and away from each other by means of the applicator 4, but also in that the hydraulic motors 42 for driving the two chains are connected in series or in parallel via flow distributors, such that the motors will positively drive the two chains at exactly the same speed. Hence, it is avoided that one feeding unit slips in case it temporarily loses its grip of the stem.

The one-grapple harvester shown in FIGS. 1 and 2 further includes two limbing tools 53, 53' in the form of fixed arcuate knives. The knife 53 is carried by a support arm consisting of two plates 54, 55 which are interconnected by means of an end plate 56 at the front end of the feeding unit 1. At their rear ends, the plates 54, 55 are articulated to the frame 2 by means of hinge pins 57. As best seen in FIG. 2, the hinge pin 57 at the underside of the feeding unit 1 is provided on the free end of a mounting plate 58 disposed at the underside. The plate 55 is provided with a stop 59 in the form of a bracket adapted to cooperate with an abutment pin 59' projecting downwardly from the mounting plate 58, more specifically such that the abutment pin ensures that the support arm consisting of the plates 54, 55 cannot be swung inwards towards the tree stem farther than the position shown in FIG. 2. Thus, from this inner end position the arm can be swung outwards at least a short distance while removing the limbing knife 53 from a stem being fed through the harvester.

Similarly, the limbing knife 53' is also carried by a support arm consisting of two spaced-apart plates 54', 55'.

Each support arm is further associated with two arcuate or jaw-like limbing tools 60, 61 and 60', 61', respectively, which are pivotally mounted and movable towards and away from each other in the direction of the double arrow B. The jaws 60, 61 are mounted on shafts 62 arranged between two spaced-apart plates 63, 64 the latter of which is connected to the end plate 56 by means of a tubular member 65 in which a hydraulic motor may be provided for rotating the shaft 62. To ensure synchronous movement of the two jaws 60, 61, these are interconnected, for instance by gear means 66. Also the jaws 60', 61' are mounted in the manner now described.

The limbing knife 53' is mounted on an extension tube 67 for positioning the knife a certain distance in front of the knife 53. In that the two knives 53, 53' are offset in the longitudinal direction in relation to each other in this manner, one knife will encounter the branches of a whorl on the stem before the other knife does, whereby the instantaneous limbing resistance will be considerably reduced as compared with the case where the knives are located in the same plane.

On the upper plates or arm parts 54, 54' of the two support arms, there are provided arcuate legs 68, 68' serving as abutments when the harvester is applied to a tree stem. By their arcuate geometry, these legs will locate the two feeding units 1, 1' opposite the centre of the stem, whether it is large or small.

In order to hold the two limbing knives 53, 53' yieldingly urged against the tree stem, the two support arms are actuated by power means or spring means 69, 69' (e.g. hydraulic cylinders or gas springs) which in the illustrated embodiment extend between the abutment legs 68 and extensions of the brackets 18', 19' supporting the frames 2, 2'. With the aid of these means 69, 69', the limbing knives are held distinctly, though yieldingly applied against the stem and, by being pivotal, can follow any unevenness on the stem.

OPERATION AND ADVANTAGES OF THE INVENTION

When the harvester now described should be applied to a standing tree, the applicator 4 is swung upwards in relation to the rotator 7 by means of the cylinder 10, to a position in which the two elongate feeding units 1, 1' are oriented substantially vertically. Also, the two feeding units are kept spaced from each other a considerable distance in that the telescopic tubes 6', 6" are extended from the tube 6 by means of the cylinder 5. Further, the jaws 60, 61 and 60', 61' are swung out to their outer end positions in which the stem can pass between them. The harvester is thereafter moved in towards the stem so that this will be engaged both by the two abutment legs 68, 68' and by the inner part of the grapple 11, whereupon the movable arm 14 of the grapple is clamped against the stem while firmly holding it. At this stage, the stem can be cross-cut at its butt end by means of the cutting tool 17.

As soon as the grapple 11 has been caused to clamp the stem, the two feeding units can be actuated so as to move towards each other in their common plane and be pressed against diametrically opposed sides of the stem. This is achieved by shortening the telescopic tube assembly by means of the cylinder 5. Also, the limbing jaws 60, 61 and 60', 61' are pivoted inwards and applied to the outer side of the stem, whereupon the stem is fed through the harvester in that the chains 23 of the respective feeding unit are caused to move in the direction of the arrows in FIG. 2. During this feeding, the two limbing knives 53, 53', together with the pivotal limbing tools 60, 61, 60', 61', will cut off or otherwise remove the branches of the tree.

In that the two feeding units, as described above, are movable towards and away from each other in a common plane together with the two associated limbing tools, they will become self-centering, whereby complicated movement patterns for the feeding units and the limbing tools are avoided. Further, the limbing knives 53, 53' will always have ideal directions of force application in that the limbing knives with the associated support arms 54, 55 are located in substantially the same plane as those parts of the chains of the feeding units which engage the stem. Since the limbing tools spaced from the feeding units are mounted on arms which are pivotal relative to the feeding units and are held yieldingly applied against the stem, the limbing tools can readily follow any unevennesses on the stem without getting stuck thereby. In an analogous manner, the feeding units can also follow unevennesses on the stem by being pivotally suspended from the rest of the assembly. The feeding unit shown in FIGS. 3–6 can be made extremely compact and yet apply very large feeding forces to the stem while using relatively small moments of force in the drive shafts, in that the radii of the moments concerned are small while at the same time the contact pressure of the drivers is evenly distributed throughout the length of the feeding units since the drivers and the links are allowed to abut along the entire length of the bar 20. Since the mounting points of the feeding units in the hinge joints 3, 3' are located in the immediate vicinity of the periphery of the stem, when these units are applied against the stem, the feeding units will never tend to rear, even at maximal tractive forces, which is the case in conventional bogie constructions.

POSSIBLE MODIFICATIONS OF THE INVENTION

It goes without saying that the invention is not restricted only to the embodiment described above and illustrated in the drawings. Thus, it is also conceivable to use the limbing assembly formed of the feeding units 1 and the limbing tools 53 other than in a one-grapple harvester, e.g. in a twin-grapple harvester. Further, the applicator which is required for moving the feeding units towards and away from each other may be designed otherwise than in the form of the telescopic tubes shown in the drawings. Also, it is possible to use other types of feeding units than those shown in FIGS. 3–6, although these are preferred in practice. While the motor 42 in FIG. 6 is included in the bottom part 41 of the frame 2, it may also be mounted on the top part of the frame as indicated in FIG. 1. Finally, it is also conceivable to have the feeding units move in towards the stem other than in a common plane.

I claim:

1. An assembly for the limbing of a tree trunk comprising
    at least two limbing means adapted to remove limbs from a tree trunk each separately pivotably mounted on at least two respective feeding means adapted to effect transport of said limbing means longitudinally along a tree trunk so as to feed individual limbs to said at least two limbing means, said at least two feeding means being mounted upon a supporting frame which includes means to move said at least two feeding means into contact with said tree trunk and out of contact from said tree trunk, said at least two limbing means being mounted upon respective support arms pivotably mounted on respective feeding means, said feeding means each including a stop means which cooperates with each said respective support arm to prevent said limbing means from moving toward said tree trunk beyond a point in a plane defined by the contact surface of said feeding means with said tree trunk, each said support are adapted to pivot about a pivot axis parallel to said contact surface and located substantially in the plane defined by said contact surface with said tree trunk, and means to urge said limbing means toward said tree trunk.

2. The assembly of claim 1 wherein said at least two feeding means each comprise an endless chain comprised of a plurality of articulated chain-forming links movable along the periphery of an elongate rigid frame.

3. The assembly of claim 1 wherein said limbing means includes an arcuate blade fixedly connected to said support arm.

4. The assembly of claim 3 wherein said limbing means further includes at least one auxiliary blade pivotably mounted on said support arm and adapted to be urged against portions of said tree trunk inaccessible to said fixed blade.

5. The assembly of claim 4 including two auxiliary blades off-set in relation to each other in the longitudinal feeding direction.

6. The assembly of claim 1 wherein each said feeding means is pivotably supported on said common supporting frame.

7. The assembly of claim 6 wherein each said feeding means is adapted to rotate about a pivot axis defined by the portion of said chain in contact with said tree trunk.

8. The assembly of claim 1 further including means to position said assembly in encompassing relation to a tree trunk, means to cross-cut said tree trunk, and arcuate support arms fixedly attached to each said support arm adapted to serve as guide means for said assembly along said tree trunk.

9. The assembly of claim 1 wherein said means to move said at least two feeding means into and out of contact with said tree trunk comprises a telescoping portion of said supporting frame to which each said feeding means is attached.

10. The assembly of claim 1 wherein said pivot axis is perpendicular to the direction of movement of said limbing means along said tree trunk.

* * * * *